UNITED STATES PATENT OFFICE.

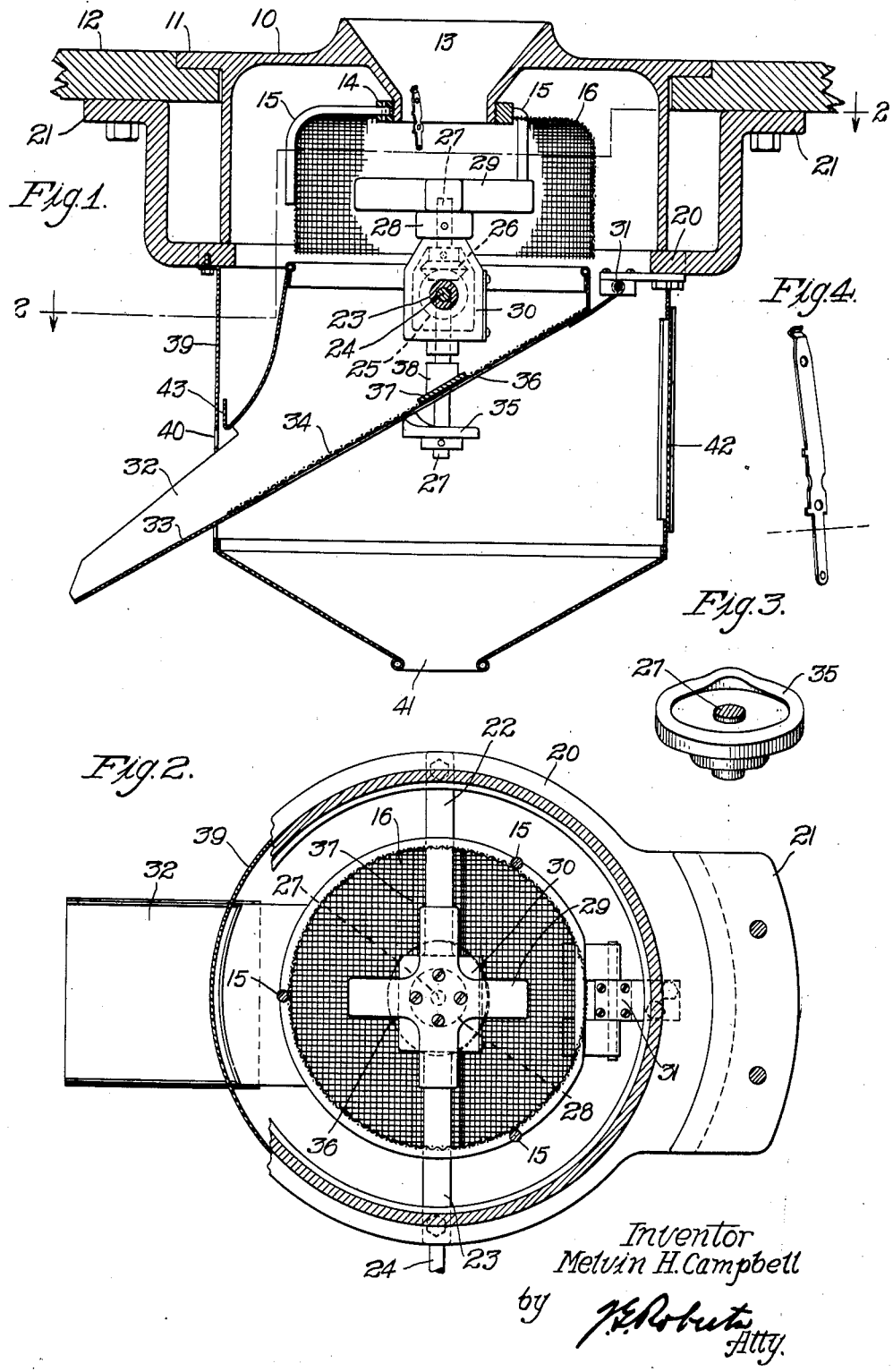

MELVIN H. CAMPBELL, OF CHICAGO, ILLINOIS, ASSIGNOR TO WESTERN ELECTRIC COMPANY, INCORPORATED, OF NEW YORK, N. Y., A CORPORATION OF NEW YORK.

TINNING MECHANISM.

1,368,020.   Specification of Letters Patent.   Patented Feb. 8, 1921.

Application filed October 4, 1918. Serial No. 256,842.

*To all whom it may concern:*

Be it known that I, MELVIN H. CAMPBELL, a citizen of the United States, residing at Chicago, in the county of Cook and State of Illinois, have invented certain new and useful Improvements in Tinning Mechanism, of which the following is a full, clear, concise, and exact description.

This invention relates to mechanism for facilitating the tinning of small parts such as contact springs and similar articles which are to receive soldered connections.

The object of the invention is to provide a mechanism whereby such parts may be rapidly and efficiently tinned without the exercise of any particular skill on the part of the operator and one which will remove the danger of the operator being injured by the molten tin and will also serve to salvage or save the excess tin which is removed from the parts in the operation.

In accordance with the general features of this invention there is provided a movable member into engagement with which the parts which have previously been dipped into a tin bath are dropped and which movable member projects these parts against a wall of perforated material, the impact between the movable member and the parts to be tinned and the wall and the parts to be tinned serving to remove all excess tin from these parts. The tin so removed is projected through the perforated wall and subsequently collected while the parts which have been tinned are caused to pass from the mechanism through a suitable delivery chute or tube which is preferably given a vibratory movement to facilitate the delivery of the parts and prevent the tin jarred from the parts forming obstructions to the passage of the parts thereover.

It has been the standard practice heretofore to tin similar parts by hand, in which operation the operator gathers a few of the springs together, dips the ends to be tinned into the tin bath, withdraws them, and strikes them against the side of a pan or receptacle to remove the excess tin from the ends. This operation not only requires considerable skill on the part of an operator, but is a laborious and tedious process attended with the danger that the operator may be painfully burned from the molten or hot tin which flies from the parts when they are struck against the side of the receptacle.

In the drawings illustrating the invention:

Figure 1 is a vertical cross-sectional view through the center of the machine, with certain parts left in elevation;

Fig. 2 is a section taken on the line 2—2 of Fig. 1;

Fig. 3 is a perspective view of a cam used to vibrate the chute, and

Fig. 4 is a perspective view of a flat spring which may be operated upon by this mechanism with the part which is tinned indicated by the part below the broken line.

As shown in the drawings, 10 designates a cylindrical shaped supporting member provided with a flange 11 which fits into a depression in a bench or table 12. In the top of the supporting member 10 an opening 13 is formed for the entrance of the parts to be operated on. The wall forming opening 13 is circular and is inclined downwardly, the lower end thereof merging into a short vertical wall which is screw threaded on the outside for the reception of a collar 14 carrying arms 15, 15 which in turn support an inverted cup-shaped member 16 made of screen or perforated material. An opening is formed in the member 16 in the top and in line with the opening 13 for the entrance of the parts. Abutting against the lower end of the cylindrical shaped member 10 is a supporting collar 20 equipped with the outwardly and upwardly extending feet 21, 21 which are secured to the under side of the bench 12. The collar 20 carries bearings 22 and 23 for a main horizontal drive shaft 24 which is connected to any suitable source of power. On the inner end of the shaft 24 is secured a bevel gear 25 which meshes with a bevel gear 26 secured to the vertical shaft 27. The upper end of the shaft 27 has pinned thereto a collar 28 to which is secured a projector 29 having a plurality of radially projecting arms of rubber or some similar flexible material. A suitable housing 30 incloses the bevel gears 25 and 26. The bearings 22 and 23, as illustrated, are made integral with the housing 30.

Secured to the supporting collar 20 by a hinge 31 is a chute 32. The chute 32 has an inclined floor 33 partly made of screen or perforated material, as indicated at 34, and is situated directly below the cup-shaped member 16. The lower end of the shaft 27 extends through the chute 32 and has secured thereto a cam 35. Secured to the under side of the chute 32 at the point where the shaft 27 protrudes is a circular plate 36 which serves as a path for the cam 35. When the cam 35 revolves, it will cause the chute 32 to be raised and lowered being pivoted at the hinge 31. A stiffening bar 37 is secured across the chute 32 and carries a collar 38 at the point where the shaft 27 passes through the chute 32. Suitable openings are made in the collar 38, stiffening bar 37, screen 34 of the chute 32, and the path 36 to allow for the raising and lowering of the chute 32 caused by the revolving of the cam 35.

Secured to the under side of the supporting collar 20 is a circular housing 39 which incloses the lower part of the machine. A suitable opening 40 is formed near the bottom for the chute 32 to protrude through. The bottom of the housing 39 is cone shaped and has an opening 41 formed therein. Opposite the opening 40 in housing 39 is a door 42 for entrance to the lower part of the machine for purposes of cleaning and repair.

An upwardly extending lip 43 is formed on the chute 32 at the point where it extends through the housing 39. The lip 43 serves to keep any falling tin from lodging on the lower end of the chute 32 at the point where it extends through the housing 39.

In the operation of this machine the operator starts the machine causing the flexible spoked projector 29 to revolve very rapidly, also the cam 35 which causes the chute 32 to rise and fall very rapidly. The operator then takes a number of the parts to be tinned in her hand and dips the ends into molten tin, then immediately drops the tinned parts into the opening 13. Passing through the opening 13 the tinned parts will drop and come into contact with the rapidly revolving projector 29 where they will be projected with considerable force against the screen or perforated material forming the wall of the cup-shaped member 16. The abrupt stop of the tinned parts caused by coming into contact with the cup-shaped member 16 will cause the excess tin which is still in a molten stage to break away from the part and be scattered through the screen where most of it will lodge on the interior of cylindrical part 10. A small part of the scattered tin will drop down onto the screen 34 of the chute 32 or will fall outside of the chute 32 and down to the bottom of the housing 39 and through the opening 41 into a suitable receptacle. To facilitate recovering the tin which lodges on the interior of cylindrical part 10 or for repair, the supporting member 10 is easily removable, not being fastened to the table 12 but merely resting in a depression therein. The tinned parts after being projected by the flexible spoked projector 29 against the cup shaped member 16 will now have a thin coating of tin and will drop onto the rapidly vibrating screen of the chute 32 where they will slide down to the lower part and into a suitable receptacle. The action of the cam 35 tends to keep the tinned parts moving downward after falling into the chute and also to loosen and cause any tin which has fallen on the inside of the cup-shaped member 16 down into the chute 32 to fall through the screen floor 34 of the chute and through the opening 41 into a suitable receptacle.

What is claimed is:

1. In a machine for facilitating the tinning of parts, a perforated wall, and a rapidly moving member coöperating therewith to remove the excess tin from tin dipped parts by contacting with said parts and projecting them against said perforated wall.

2. In a machine for removing the excess tin from dipped parts, a rapidly moving member, an inclosing casing therefor, a perforated wall surrounding said moving member and coöperating therewith, and an opening in said casing through which tin dipped parts may be introduced into engagement with said rapidly moving member.

3. In a machine for removing the excess tin from dipped parts, a rapidly revolving member, and a perforated wall surrounding said member against which the tin dipped parts are projected by said rapidly revolving member.

4. In a machine for removing the excess tin from tin dipped parts, a rapidly revolving flexible armed member, and a perforated wall surrounding said member against which the tin dipped parts are projected by said rotating member.

5. In a machine for facilitating the tinning of parts, mechanically operated means for removing the excess tin from tin dipped parts, and a vibrating member located below said mechanically operated means for receiving and delivering the parts dropping from said mechanically operated means.

6. In a machine for facilitating the tinning of parts, mechanically operated means for removing the excess tin from dipped parts, and a vibrating screened member located below said mechanically operated means for receiving and delivering the parts dropping from said mechanically operated means.

7. In a machine for removing the excess tin from dipped parts, a rapidly revolving member, a driving shaft for said member, a perforated wall surrounding said member against which the tin dipped parts are projected by said revolving member, a screened chute for receiving the tin dipped parts, and means carried by said shaft for vibrating said chute.

8. In a machine for removing the excess tin from dipped parts, a rapidly revolving member, a driving shaft for said member, a perforated wall surrounding said member against which the tin dipped parts are projected by said member, a hinged chute located below said revolving member and said perforated wall, and means carried by said shaft for vibrating said chute.

In witness whereof, I hereunto subscribe my name this 14th day of Sept., A. D. 1918.

MELVIN H. CAMPBELL.